Feb. 25, 1969  F. H. CARY  3,429,406
TORQUE DECLUTCHING AND SWITCH MECHANISM
Filed July 26, 1967  Sheet 1 of 2

INVENTOR
FRANCIS H. CARY
BY
Barlow & Barlow
ATTORNEYS

United States Patent Office 3,429,406
Patented Feb. 25, 1969

3,429,406
TORQUE DECLUTCHING AND SWITCH
MECHANISM
Francis H. Cary, North Scituate, R.I., assignor, by mesne
assignments, to General Signal Corporation
Filed July 26, 1967, Ser. No. 656,144
U.S. Cl. 192—.034                                    3 Claims
Int. Cl. F16d 43/22, 47/00, 23/00

ABSTRACT OF THE DISCLOSURE

A clutching mechanism having a plurality of plates mounted on a common axis and relatively movable axially of each other and held together by a spring means for clutch operation but movable axially when the torque exceeds the spring pressure holding the plates together for a declutching action. When declutching takes place, switches are provided actuated by the movement of the plates in their declutching action to stop the motor which drives the clutch. The arrangement is such that declutching will occur in either direction of rotation as well as selective switch actuation.

Background of the invention

In the opening and closing of valves such as a butterfly valve, a motor is often used. Such a valve often has a stop or limit of its moving part, and if the motor is not stopped, there may be damaged to motor or unwanted strain on the mechanical parts. In some cases resilient means are utilized to absorb an overrun but usually two separate means are necessary.

Summary of the invention

The clutch mechanism includes a drive shaft plate, a driven shaft plate and a clutch plate between the two plates. Means are provided between the clutch plate and the other two plates for creating positive driving engagement between the clutch plate and one of the plates in one direction of rotation and between the clutch plate and the other plate in the other direction of rotation, while camming means are provided between the clutch plate and the other two plates for sliding the plates relatively axially for separation of the plates against the action of a single spring means that normally forces the plates together. The torque declutching is between the clutch plate and one plate when in one direction of rotation and between the clutch plate and the other plate in the other direction of rotation. Switch means are also provided which are moved by the axial movement of the plates for stopping the drive motor when either of the plates moves to a declutching position.

Brief description of the drawings

FIG. 4 is a wiring diagram of the electrical hook-up; and

Description of the preferred embodiment

Figure 1:
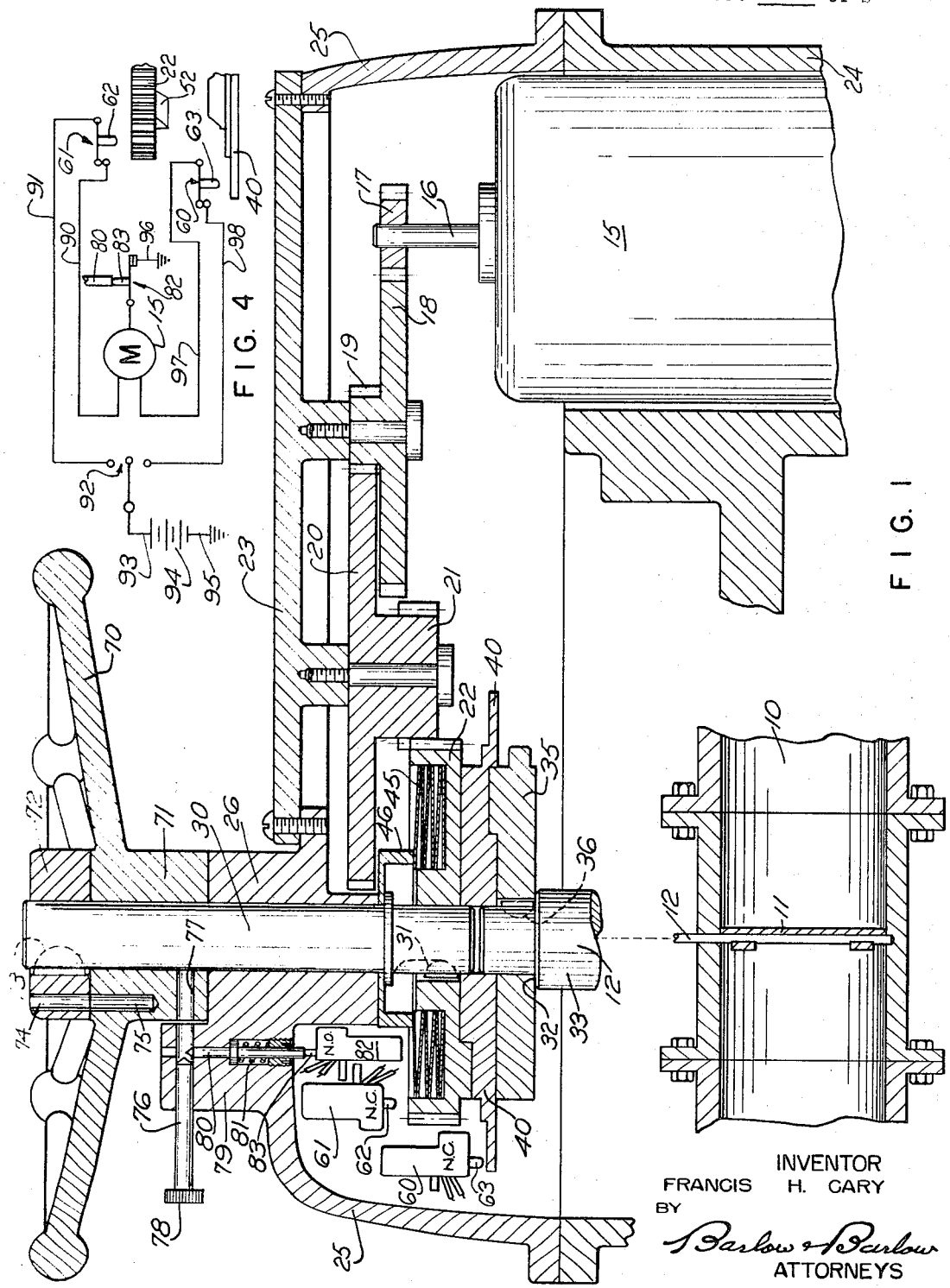
FIG. 1 is a sectional view partially diagrammatic, illustrating the clutch and its connection from the drive motor and to an operated means here shown as a butterfly valve.
Figure 2:
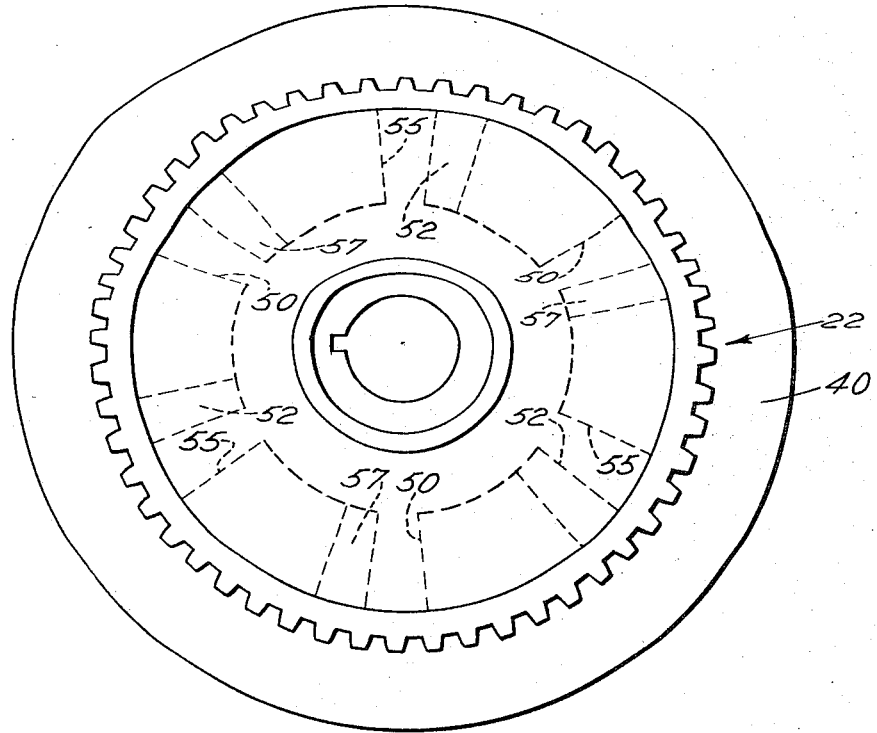
FIG. 2 is a top plan view of the three plates forming the clutch in their assembled relation.

With reference to FIG. 1 a conduit is shown at 10 in which there is located a butterfly valve 11 actuated by a shaft 12, the shaft 12 and its operating mechanism being shown on a much larger scale just above the conduit 10. The shaft 12 is driven by a motor 15 whose output shaft 16 drives the train of gears 17, 18, 19, 20, 21 to drive the tooth plate 22 of the clutch mechanism which is the subject of this invention. The gears 18, 19, 20 and 21 are supported in a housing 23 which encloses as at 24 the motor 15 and also has a portion 25 which provides a bearing 26 for the drive shaft 30 to which the drive shaft plate 22 is keyed as at 31 in such a manner that the plate 22 may slide axially of the shaft 30.

Driven shaft 12 is provided with a shoulder 32 by reason of the enlarged portion 33 of this driven shaft 12 and serves as a rest for the driven shaft plate 35 which is fixed against axial movement along the driven shaft 12 and is keyed to this shaft as at 36 so as to rotate therewith.

A clutch plate 40 is located between the drive shaft plate 22 and the driven shaft plate 35 and is free to slide axially along both of the shafts 12 and 30 and is also free to rotate about the axis of each of these shafts but does serve the function of coupling the two shafts together when the plates 22 and 40 and 35 are urged into coupling relation by a spring means 45 which is shown here as a plurality of Bellville washers which engage the drive shaft plate 22 and act between it and the housing 26 through a suitable cupped washer 46.

Figure 3:
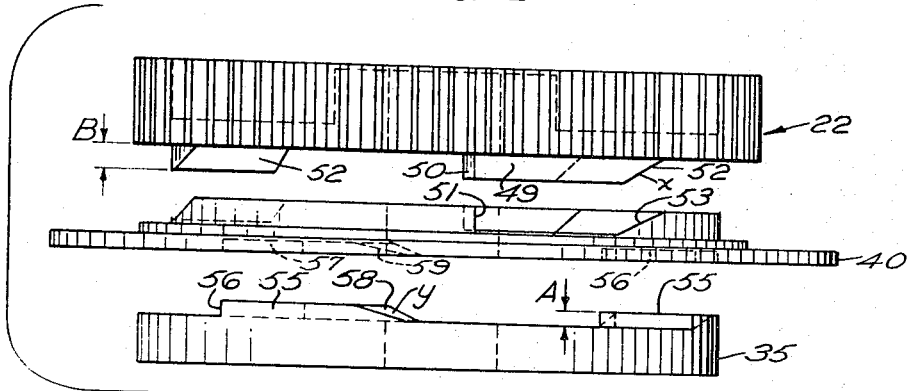
FIG. 3 is an exploded side elevation of the three plates.
Figure 5:
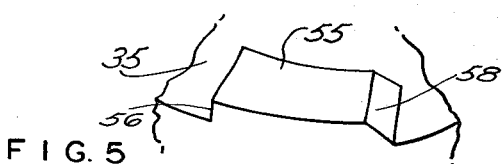
FIG. 5 is a detail perspective view of a projection on one of the clutch plates.

Interfitting recesses and projections between the clutch plate and the plates at either side of it serve as the clutching means for transferring rotation from the drive shaft to the driven shaft. The projections are the same except for height, see FIG. 5, where one projection 55 is shown. On the drive shaft plate 22 (FIG. 3) there are a plurality of projections 49 each of which has a square abutment 50 which engages a correspondingly square shape face 51 of a recess in the clutch plate 40 so as to drive this clutch plate in one direction of rotation. There is also a cam shape or inclined face 52 on each projection 49 which engages a correspondingly shaped inclined face 53 of the recess in the clutch plate and will serve to drive the clutch plate in the opposite direction of rotation so long as the pressure of the spring 45 maintains engagement. However, should the torque increase beyond a certain amount, the spring pressure of the resilient means 45 will yield under the wedge or camming action of the inclined surfaces and the drive shaft plate 22 will be axially moved so as to slide the plate 22 upwardly as seen in FIG. 1 to separate the plates 22 and 40 and prevent further driving action in that direction. Should the projection enter another recess, the slip action would be repeated. Also as seen in FIG. 3, the driven shaft plate 35 will have a plurality of similar projections 55, each having a square face 56 to enter a recess in the clutch plate 40 having a square face 57 and will serve to provide a driving action between the clutch plate and the driven shaft plate 35 in the opposite direction of rotation from the engagement between the square faces of the projections 50 and recesses 51. Also there will be an inclined face 58 on each projection 55 of the driven shaft plate 35 which will enter a recess having a corresponding inclined face 59 in the clutch plate 40 so that should there be a torque in the opposite direction of rotation from the drive between the square faced projection and recess 56 and 57, the clutch plate 40 will be moved axially to separate the engagement between the clutch plate 40 and the driven shaft 35. This will also carry the drive shaft plate 22 upwardly maintaining its clutched relationship. Thus, there is an engagement between 50 and 51 when the plates are in assembled relation as shown in FIG. 1 under the resilient means 45 for positive driving in one direction, while there is a connection between the square projection face 56 and recess face 57 for positive drive in the other direction when the plates are in nested relation. Likewise, there is a camming action to keep the plates in engagement so long as the torque does not exceed the pressure of the spring 45 in one direction between the cam surfaces 52 and 53 or in the other direction between cam surfaces 58 and 59.

For reasons explained later, the height of the projections 55 shown by the spacing A (FIG. 3) should be less than the height of the projections 49 shown by the spacing B.

The angle of the clutch faces 52 is designated $x$, and the angle of the faces 58 is designated $y$. These angles $x$ and $y$ are chosen in accordance with the following formula:

$F_s$=spring force (as selected)
$T$=torque required as a maximum limit
$R$=radius of lugs
$K$=coefficient of friction of lug against mating plate $$\tan(x+K) = \frac{F_s R}{Tx}$$

$$\tan(y+)K = \frac{F_s R}{Ty}$$

From the above it will be seen that the plates 40 and 22 move axially when torque is exceeded either in one direction or the other, one or both being actuated depending upon the direction of rotation. Accordingly, I may provide switches 60 and 61, the switch 60 being actuated by movement of the clutch plate 40 and the switch 61 being actuated by movement of the drive shaft plate 22. The gap between the button 63 of the switch 60 is less than the height A of the projection knobs 55, so that it will be actuated by axial movement of clutch plate 40. The gap between the button 62 of the switch 61 is greater than the height A of the projection knob 55 and less than the height B of the projecting knob 49 so that it will not be actuated except by the greater axial movement of the drive shaft plate 22. The switches 60 and 61 are normally closed switches and are opened by movement of the pins 62, 63 upwardly.

In some cases it may be desirable to actuate the drive shaft 30 manually, and I have shown a hand wheel 70 having a hub 71 rotatably mounted upon the drive shaft 30. A collar 72 is keyed as at 73 to this shaft and is provided with an opening 74 to register with a recess 75 in the hub 71 so as to receive a pin 76 which may be dropped therein to lock the hand wheel to the shaft. When the shaft is to be hand operated, a hand wheel locking pin 76 will be withdrawn by the handle 78 from the recess 77 in the projection 79 and placed in the opening 74 and recess 75. The withdrawal of the pin 76 from the projection 79 will permit a pin 80 to rise under the action of a spring 81 and permit the normally open switch 82 to have its button 83 released, thereby opening the switch and disconnecting power to the switches 60, 61 and the motor 15.

Referring to the wiring diagram in FIG. 4, the motor 15 is shown as a reversible type and may be operated in either direction through the manual operation of switch 92 that selectively supplies power from a source indicated at 94 to either leads 90, 91 or leads 97, 98. The excessive torque responsive switches 60 and 61 are located in the reversing leads, the switch 60 interrupting leads 97, 98 while switch 61 interrupts leads 90, 91. There is also provided in the common lead to the motor the switch 82 which will open when the locking pin 76 is removed from its hole in the housing projection 79. As mentioned above, the height of the projections 49 is greater than the height of the projections 55 and similarly by referring to FIG. 1 it will be noted that the physical location therefore of switch button 63 is closer to the clutch plate 40 than is the switch button 62 to the drive plate 22.

The butterfly valve 11 as shown in FIG. 1 has a normal turning relation of 90° in the conduit 10, and at each end of the 90° rotation there is a resistance or limit to further rotation. The clutch which controls the drive of the shaft 12 will cause the projections 55 on the driven plate 35 at one limit of the rotation of the butterfly valve to cam the plates 40 and 22 axially causing a declutching action and also a shutting off of the power transmitted to the driven shaft 12 by the motor 15. In a similar manner the projections 49 will cause a declutching action and a power cutoff to the driving motor for the other limit of the rotation through 90° of the butterfly valve. It will also be apparent that should there be a sticking or other obstruction between the limits of 90° movement of the butterfly valve which would interfere with the turning of the valve, a similar action of the axial movement of the plates to cause declutching action will occur.

I claim:
1. In a clutch mechanism, a drive shaft, means for driving said shaft, a driven shaft, clutch means for coupling and uncoupling said shafts comprising
  (a) a driven shaft plate fixed against relative axial movement relative to said driven shaft and keyed thereto,
  (b) a drive shaft plate axially slidable along said drive shaft and keyed thereto,
  (c) a clutch plate between said drive shaft plate and said driven shaft, said plate being axially and rotatably movable relative to both said drive and driven shafts,
  (d) resilient means urging said plates together,
  (e) a first means between said drive shaft plate and clutch plate for positive drive of said clutch plate in a first rotative direction when engaged,
  (f) a second means between said clutch plate and driven shaft plate for positive drive of said driven shaft plate in the other second rotative direction when engaged,
  (g) a first torque responsive means between said drive shaft plate and clutch plate to relatively move said plates axially sufficient to disconnect the plate when the torque in the other second rotative direction exceeds the pressure of the resilient means,
  (h) a second torque responsive means between said driven shaft plate and clutch plate to relatively move these plates axially when the torque in the first rotative direction exceeds the pressure of said resilient mean sufficient to disconnect said plates.

2. A clutch mechanism as in claim 1 wherein the axial movement of one said first and second torque responsive means is greater than the other.

3. A clutch mechanism as in claim 2 wherein electric means are provided for driving said shaft, electric switches being in circuit with said electric means and having their actuators located in the path of axial movement of said drive shaft plate and clutch plate whereby excessive torque will operate at least one of said switches.

References Cited

UNITED STATES PATENTS

| | | | |
|---|---|---|---|
| 1,883,164 | 10/1932 | Vassakos | 192—150 |
| 2,525,915 | 10/1950 | Kuhn | 192—150 XR |
| 2,825,862 | 3/1958 | Price | 192—.034 XR |

CARLTON R. CROYLE, *Primary Examiner.*

ALLAN D. HERRMANN, *Assistant Examiner.*

U.S. Cl. X.R.

192—150